Figure 1:
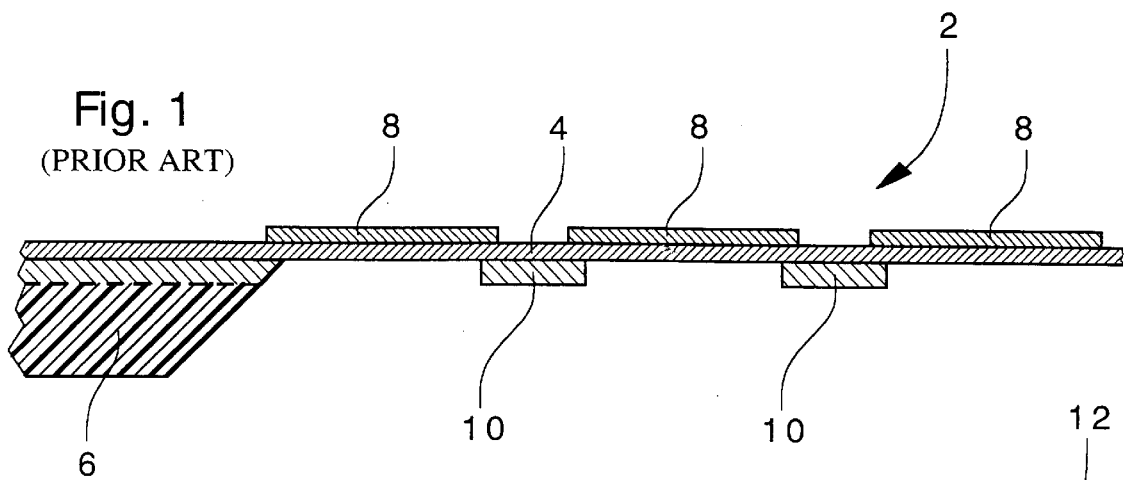

United States Patent
Münch et al.

[19]

[11] Patent Number: 6,040,579
[45] Date of Patent: Mar. 21, 2000

[54] THERMOELECTRIC SENSOR

[75] Inventors: Ulrich Münch, Neuchâtel, Switzerland; Dominik Jaeggi, San Francisco, Calif.; Niklaus Schneeberger, Dübendorf, Switzerland

[73] Assignee: EM Microelectronic-Marin SA, Marin, Switzerland

[21] Appl. No.: 09/030,025

[22] Filed: Feb. 25, 1998

[30] Foreign Application Priority Data

Feb. 28, 1997 [EP] European Pat. Off. .............. 97103317

[51] Int. Cl.⁷ ...................................... G01J 5/12
[52] U.S. Cl. ...................... 250/344; 250/338.4; 250/352; 73/204.26; 136/225
[58] Field of Search ................................ 250/349, 338.4, 250/339.03, 339.02, 352; 73/204.26; 136/225

[56] References Cited

U.S. PATENT DOCUMENTS 4,465,894  8/1984  Reyes ..................................... 136/225
5,721,430  2/1998  Wong ................................. 250/339.13

FOREIGN PATENT DOCUMENTS 2 555 312  5/1985  France .

OTHER PUBLICATIONS

Sensors and Actuators A, vol. A48, No. 1, May 1, 1995, pp. 47–54, XP000521309 Baer W G et al: "A 32–Element Micromachined Thermal Imager with On–Chip Multiplexing".

1995 IEEE Tencon, IEEE Region Ten International Conference on Microelectronics and VLSI, Hong Kong, Nov. 6–10, 1995, Nov. 6, 1995 Institute of Electrical and Electronics Engineers, pp. 198–201, XP000585776 Schneeberger N et al: "Optimized CMOS Infrared Detector Microsystems".

*Primary Examiner*—Constantine Hannaher
*Assistant Examiner*—Albert Gagliardi
*Attorney, Agent, or Firm*—Griffin, Butler, Whisenhunt & Szipl, LLP

[57] ABSTRACT

Thermoelectric sensor (12) formed by a membrane (14) including a plurality of thermoelectric elements (20) formed of a plurality of thermoelectric couples and forming a plurality of elementary cells. Each elementary cell is thermally insulated from adjacent elementary cells by metal wires (22, 23), preferably gold wires, arranged on the front face (25) of the membrane (14), more particularly, on an upper passivation layer (30). The metal wires (22 and 23) are thermally connected to a substrate (16) supporting said membrane. The two wires separating two adjacent thermoelectric elements (20) are separated from each other by an intermediate low thermal conduction region (28).

8 Claims, 3 Drawing Sheets

THERMOELECTRIC SENSOR

The present invention concerns a thermoelectric sensor formed by a membrane including a plurality of thermoelectric elements defining respectively a plurality of elementary cells. Generally, each thermoelectric element is formed of a plurality of thermoelectric couples and defines an elementary surface distinct from the others.

In order for the sensor to be able accurately to measure a quantity of received thermal energy, each elementary cell must be thermally insulated as best possible from the others. Indeed, one must avoid thermal energy detected by one elementary cell being subsequently diffused towards other elementary cells and again being detected.

Thermoelectric sensors formed by a membrane including a plurality of thermoelectric elements are subject to the aforementioned problem, given that the membrane itself does not allow diffusion of received thermal energy into a thermally conductive substrate so as to avoid diffusion of received thermal energy in the vicinity of the membrane itself.

FIG. 1 shows, in a schematic and simplified manner, a thermoelectric sensor of the prior art described in the document by A. D. Oliver et al., entitled "A bulk micromachined 1024-element uncooled infrared imager", more particularly the embodiment described in FIG. 3 of such document.

In FIG. 1 of the annexed drawings, the thermoelectric sensor 2 of the prior art includes a membrane 4 supported by a substrate 6. Several thermoelectric elements 8 are arranged on membrane 4. On the back side of membrane 4, i.e. on the side of support 6, a plurality of silicon bars 10 is provided. In the plane of membrane 4, these bars 10 delimit the plurality of elementary cells and thus define thermal conductors allowing the thermal energy received by thermoelectric elements 8 to be evacuated. Silicon is a thermal conductor and has the advantage of being also able to be used for arranging electronic means, in particular for addressing the various thermoelectric elements.

However, thermoelectric sensor 2 has other drawbacks. First, manufacturing thereof requires micromachining the front side and the back side of membrane 4, which normally generates additional difficulties for the production of such structures. Secondly, although silicon is a proper thermal conductor, its thermal conduction coefficient is relatively average. Finally, silicon bars 10 form thermal bridges between the adjacent thermoelectric elements. Thus, silicon bars 10 allow a certain evacuation of the thermal energy received by sensor 2, but insulate relatively poorly the elementary cells from each other, which is detrimental to the efficiency and accuracy of said sensor 2.

An object of the present invention is to provide a thermoelectric sensor also formed by a membrane including a plurality of distinct thermoelectric elements and allowing accurate thermoelectric measurement, i.e. assuring very good thermal insulation of the various elementary cells from said sensor.

Another object of the present invention is to remove as far as possible the micromachining of the back side of the membrane. Finally, another object of the invention is to provide thermoelectric sensors which can be made industrially via means familiar to the man skilled in the art thus allowing relatively inexpensive high performance sensors to be obtained.

The present invention therefore concerns a thermoelectric sensor formed by a membrane including a plurality of thermoelectric elements each formed of a plurality of thermoelectric couples and respectively forming a plurality of elementary cells which define respectively a plurality of distinct elementary surfaces said membrane, characterised in that each elementary cell is thermally insulated from adjacent elementary cells by metal wires arranged on said membrane and thermally connected to a substrate supporting said membrane. The wires are preferably made of gold.

As a result of the features of the subject of the invention, the removal of incidental thermal energy by the metal conduction wires is much greater than the removal of such thermal energy by a similar silicon structure as in the prior art, given that gold in particular offers greater thermal conduction than silicon. Moreover, the thermoelectric sensor according to the invention does not require any particular micromachining of the back side of the membrane to allow conduction of the received thermal energy towards the substrate supporting the membrane.

In a preferred embodiment, each elementary cell is thermally insulated from each adjacent elementary cell by two parallel metal wires separated by an intermediate low conduction region.

As a result of the latter feature, thermal insulation between the adjacent elementary cells in very efficient, there being no thermal conduction bridge between the adjacent elementary cells as is the case in the aforecited prior art.

According to a particular feature, the metal wires or lines are arranged on an upper passivation layer of the membrane by galvanic growth, according to a technique known to the man skilled in the art for the arrangement of contact pads or bumps provided, in particular, on integrated circuits to allow external electrically connections.

Figure 2:
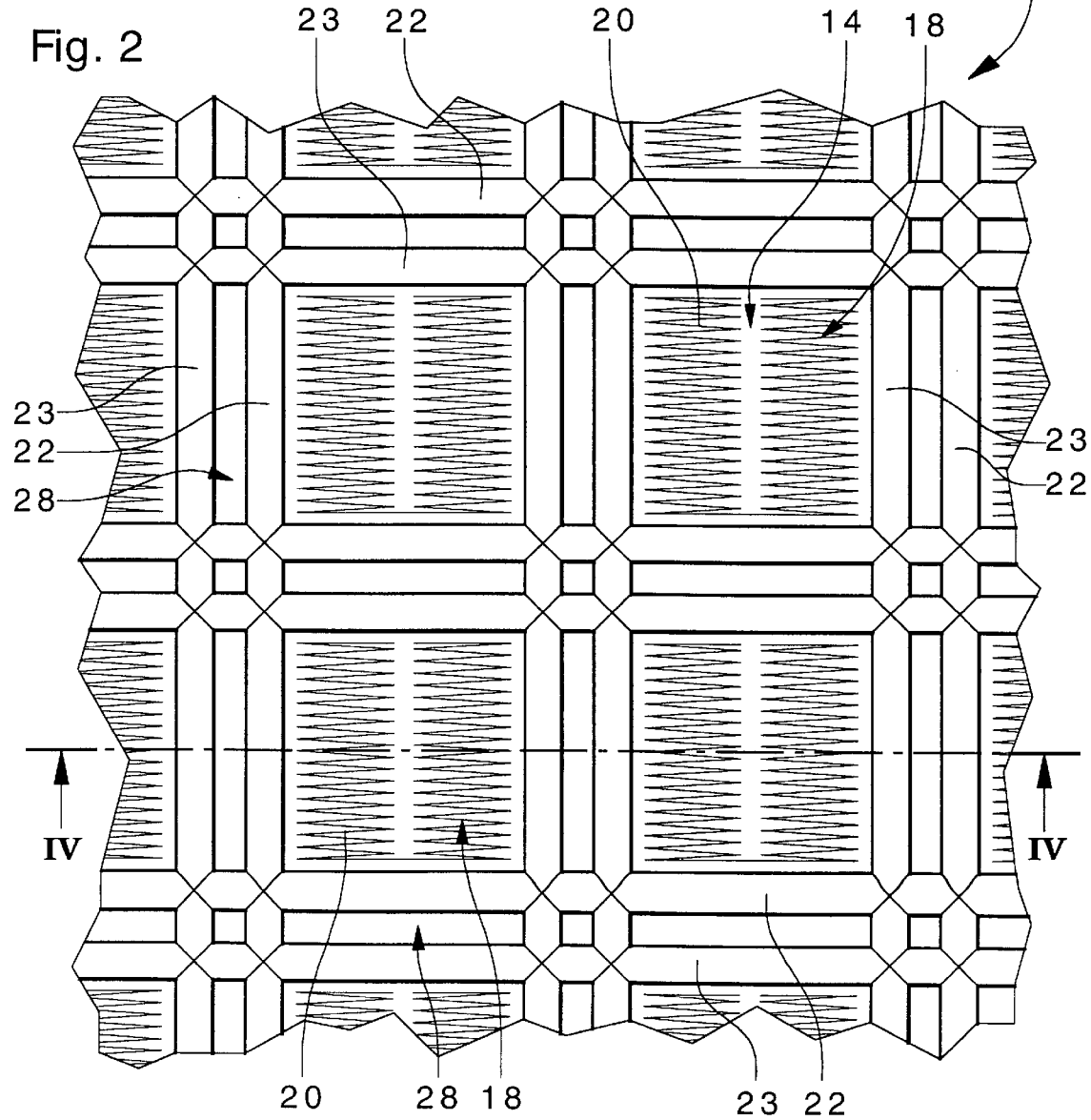
Figure 3:
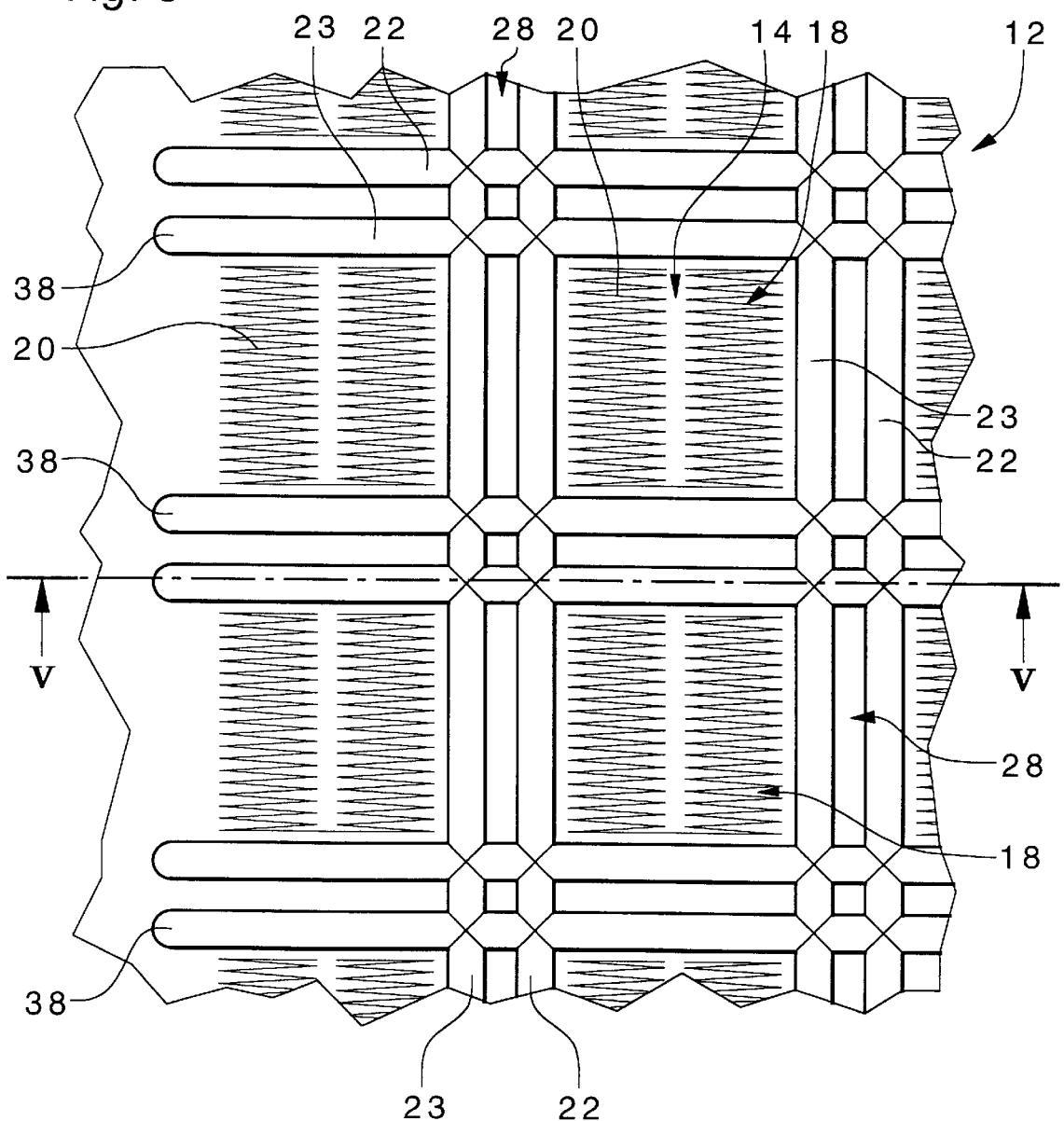
Figure 4:
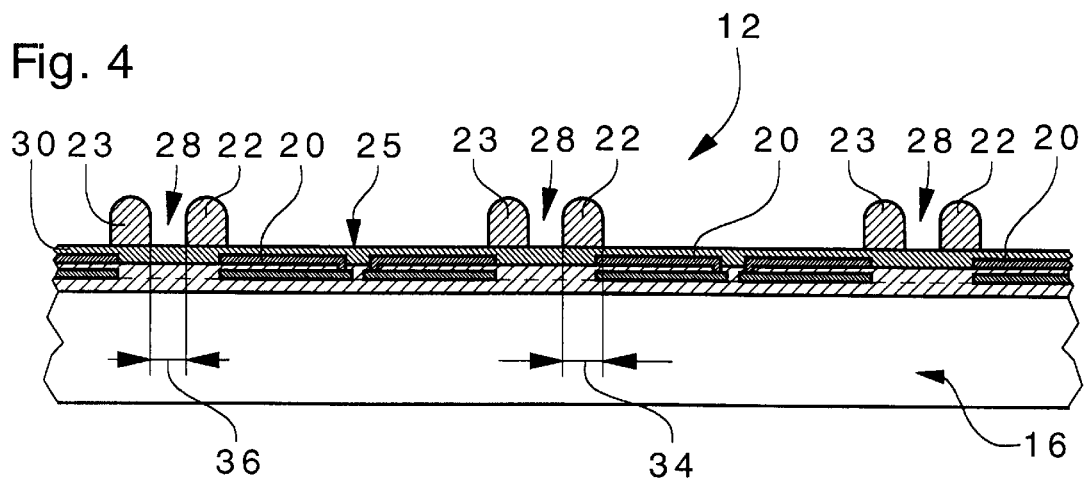
Figure 5:
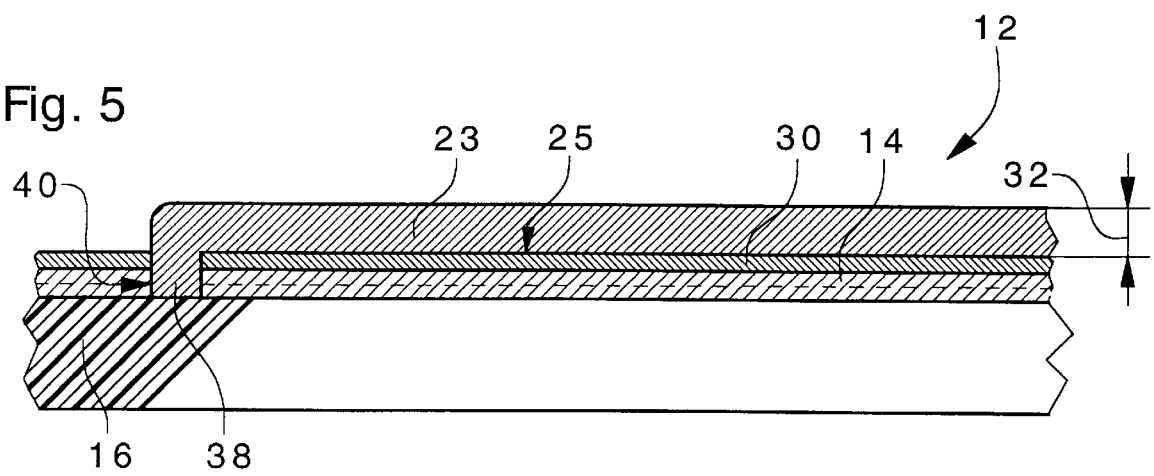

The present invention will be described in more detail hereinafter with reference to the following description, given solely by way of non-limiting example, in relation to the annexed drawings, in which:

FIG. 1, which has already been described, shows schematically a cross-section of a thermoelectric sensor of the prior art;

FIGS. 2 and 3 are partial top views of a thermoelectric sensor according to the present invention; and FIGS. 4 and 5 are partial cross-sections respectively along lines IV—IV and V—V of FIGS. 2 and 3.

Thermoelectric sensor 12 is formed by a membrane 14 supported by a substrate 16 and including a plurality of elementary cells 18. Each elementary cell 18 is formed by a thermoelectric cell 20 formed of a plurality of thermoelectric couples. Each elementary cell 18 defines a distinct elementary surface of membrane 14, this elementary surface being delimited by gold wires 22 and 23. These gold wires 22 and 23 are arranged on the front face 25 of membrane 14. They are used to insulate thermally the adjacent elementary cells in order to assure accurate measurement.

It will be noted that in an embodiment which is not described in detail here, it is possible to provide a single gold wire 22 for thermally insulating the adjacent elementary cells. However, the embodiment shown in FIGS. 2 to 5 is preferred, given that the arrangement provided in this embodiment not only allows the thermal energy received by sensor 12 to be removed with greater efficiency, but also allows the elementary cells to be thermally insulated from each other. The arrangement of two parallel gold wires separated by an intermediate low thermal conduction region 28 assures good thermal insulation between two adjacent elementary cells. In the embodiment shown here, intermediate region 28 forms a channel. In other embodiments, this intermediate region may be filled with a thermally insulating material. Thus, gold lines 22 are thermally insulated from gold lines 23 so that gold lines 22 and 23 do not form a thermal bridge between adjacent elementary cells.

In this preferred embodiment, gold lines 22 and 23 are characterised by a high thermal conduction coefficient. The plurality of elementary cells is arranged in a matrix array, gold lines 22 and 23 separating the elementary surfaces from these elementary cells forming a pattern of first lines oriented in a first direction and second lines oriented in a second perpendicular direction, these first and second lines thus crossing each other at right angles.

It will be noted that the man skilled in the art knows how to arrange thermoelectric elements formed of a plurality of thermoelectric couples in a membrane formed in particular, of silicon, polysilicon and/or silicon oxide.

Membrane 14 has an upper passivation layer 30 which covers thermoelectric elements 20. Gold wires 22 and 23 are situated atop passivation layer 30.

The gold wires may be made by galvanic growth in accordance with a technique known to the man skilled in the art. This technique allows gold wires of significant height to be made. The height of the gold wires or lines separating the elementary cells is preferably greater than or equal to 10 $\mu$m. However, any other technique for forming gold wires known to the man skilled in the art may be used to make the sensor according to the invention.

According to various alternative embodiments, the width 34 of gold wires 22 and 23 is comprised between 10 $\mu$m and 50 $\mu$m. The width 36 of intermediate region 28 between wires 22 and 23 is comprised between 10 $\mu$m and 50 $\mu$m. Such a range allows proper thermal insulation to be assured between wires 22 and wires 23 for the various alternative embodiments.

Each gold wire or line 22 and 23 ends in two terminals 38 passing through the structure of membrane 14 which extends across substrate 16. Thus, an opening 40 is provided in the aforementioned structure so that terminal 38, which is also made of gold, thermally connects wire 22 or 23 to substrate 16 to allow removal of the thermal energy received by the sensor.

It will be noted that in an alternative embodiment, the set of terminals 38 is directly connected by a gold wire or line thus defining a frame surrounding the plurality of elementary cells. In such an alternative embodiment, several openings 40 may be provided along the frame. It is also possible to provide a trench surrounding elementary cells 18 in the structure forming membrane 14 which extends across substrate 16 to assure maximum thermal coupling between the gold wires and substrate 16, which is normally formed by a silicon based material.

What is claimed is:

1. A thermoelectric sensor formed by a membrane including a plurality of elementary cells formed respectively by a plurality of thermoelectric elements, said plurality of elementary cells defining respectively a plurality of distinct elementary surfaces of said membrane, wherein each elementary cell is thermally insulated from adjacent elementary cells by metal wires arranged on one face of said membrane and thermally connected to a substrate supporting said membrane.

2. A sensor according to claim 1, wherein each elementary cell is thermally insulated from each adjacent elementary cell by two parallel metal wires and separated by an intermediate low thermal conduction region.

3. A sensor according to claim 1, wherein said metal wires are made of gold and arranged on the front face of said membrane.

4. A sensor according to claim 3, wherein said membrane comprises an upper passivation layer covering said thermoelectric elements, said gold wires being disposed atop said passivation layer.

5. A sensor according to claim 1, wherein said metal wires insulating said elementary cells are made by galvanic growth.

6. A sensor according to claim 1, wherein the height of said wires is greater than or equal to 10 $\mu$m.

7. A sensor according to claim 1, wherein said plurality of thermoelectric elements are arranged in a matrix array, said metal wires insulating said elementary cells forming a pattern of first and second wires crossing each other at right angles.

8. A sensor according claim 1, wherein each metal wire ends in two terminals passing through the structure of said membrane which extends across said substrate.

* * * * *